Patented Nov. 24, 1942

2,302,752

UNITED STATES PATENT OFFICE 2,302,752

MANUFACTURE OF CELLULOSE DERIVATIVES

Henry Dreyfus, London, England, assignor to Celanese Corporation of America, a corporation of Delaware No Drawing. Application May 8, 1940, Serial No. 333,949. In Great Britain May 23, 1939

6 Claims. (Cl. 260—230)

This invention relates to improvements in the manufacture of cellulose derivatives and products obtained therefrom.

I have discovered that cellulose derivative materials having improved properties, particularly artificial filaments, foils and other shaped articles, may be obtained by reacting cellulose derivatives containing reactive radicles in substituent groups with reagents containing two or more radicles which will react with the reactive radicles in the substituent groups. It appears probable that the reaction between the cellulose derivative materials and the other reagents involves the formation of cross linkages between the cellulosic chains.

The process of the invention is applicable to the treatment of cellulose derivatives in powder or other unshaped form, but since it frequently results in reducing the solubility of the materials in organic solvents or rendering them insoluble, which is in fact one of the advantages of the process, it is in general more applicable to the treatment of cellulose derivatives in the form of filaments, foils and other shaped articles.

The reactive radicles in the cellulose derivatives may, for example, be carboxy groups, nitrile groups, acid amide groups or halogen atoms. Thus, for example, cellulose derivatives which contain ester radicles derived from di- or other poly-carboxylic acids in which at least one carboxylic group of the acid is unesterified may be treated, as may be the corresponding amides or nitriles. Examples of such polycarboxylic acids are adipic acid, glutaric acid and phthalic acid. Again, cellulose derivatives containing ether radicles in which free carboxy groups are present may be treated, for example cellulose derivatives containing the carboxy-methyl group and obtained, for instance by reacting cellulose or cellulose derivative materials with chlor-acetic acid or ethyl chlor-acetate. Examples of radicles containing halogen atoms which may be present in the cellulose derivative materials are the chlorethyl radicle, obtained for example by treating hydroxy-ethyl cellulose with phosphorus pentachloride, or the chloracetyl radicle obtained, for example, by treating cellulose glycollate with phosphorus pentachloride.

The particular reagent employed in carrying out the process of the present invention will depend upon the nature of the reactive radicles in the cellulose derivative materials. When the materials contain carboxy groups they may be reacted, for example, with diamines, for example, ethylene diamine and 1:6-diamino hexane, with glycols or polyglycols, for example ethylene glycol, 1:5-pentane diol and diethylene glycol, with dioxides, for example butadiene dioxide or with dinitriles, for example adipic acid dinitrile. Cellulose derivatives containing nitrile groups may be reacted with dicarboxylic acids, e. g. adipic or phthalic acid, while cellulose derivatives containing halogen atoms may be reacted with diamines or with salts of dicarboxylic acids, preferably salts with di-valent metals, in the presence of diluents in which the metal halides formed are insoluble. For example the copper, magnesium, barium or mercury salt of adipic acid may be employed. Conversely metal salts of cellulose derivatives containing carboxy groups in substituent groups may be reacted with compounds containing two or more halogen atoms.

When it is desired to obtain products in which tenacity is of importance, as e. g. in the case of yarns, it is desirable if possible to avoid the use of reagents containing halogen atoms which can yield a hydrohalide acid as by-product. If it is necessary to use such reagents then it is desirable to employ conditions which will prevent any detrimental effect on the cellulose derivative materials, e. g. by carrying out the reaction at a low temperature, removing hydrohalide acid rapidly from the reaction medium, for instance by passing nitrogen or other gas through the medium, or forming a metal halide instead of hydrohalide acid, e. g. by using a metal salt of a carboxylic acid, as indicated above.

The cellulose derivative materials may contain other groups in addition to the groups containing reactive radicles. For example, cellulose derivatives containing the acetate radicle and the adipic acid ester group or other group containing a reactive radicle may be treated. Such derivatives are particularly valuable, especially when they contain a high proportion of acetate radicles, e. g. 1½ to 2 or 2¼, and e. g. ¼ to ½ of the group containing the reactive radicle per $C_6H_{10}O_5$ molecule.

The materials treated according to the process of the present invention may contain only a single cellulose derivative or may contain two or more cellulose derivatives, e. g. cellulose acetate and a cellulose derivative containing a reactive radicle as a substituent group. By using materials containing at least two cellulose derivatives containing different types of reactive radicles and treating them with a suitable reagent, the possibility of all the reactive radicles in a molecule of the reagent reacting with the same cellulosic chain can be avoided. For example, if a mixture of a cellulose derivative containing a reactive halogen atom and a cellulose derivative containing a primary amino group is reacted with a chloralkylamine, the amino group of the chloralkylamine may be caused to react with the cellulose derivative containing the reactive halogen atom and the chlorine atom of the chloralkylamine with the cellulose derivative containing the amino group. In this manner cross linkages between the cellulosic chains may be produced.

When the treatment is applied to cellulose derivatives in powder or other unshaped form the reaction may be carried out in the presence of a liquid medium which is either a solvent or a non-solvent for the starting materials and the other reagents and for the products obtained. When, however, shaped materials such as artificial filaments and foils are treated, the reaction should be carried out under such conditions that the structure of the materials is retained. This may be effected by having present a liquid medium which is a non-solvent both for the starting materials and also for the products. The liquid medium may be, and preferably is, a solvent for the substance employed to react with the cellulose derivative materials.

The reaction should generally be carried out at the lowest temperature at which the reaction can be completed in a reasonable period of time. This temperature will depend upon the nature of the reagents and may, for example, be 50° C., or less, or on the other hand it may be necessary to increase it to 100 or even 150° C. Temperatures much above 150° C. are, however, in general undesirable, particularly if shaped products are being treated, since they tend to cause an undesirable reduction in the tenacity and other properties of the materials. The reaction may be carried out under reflux conditions, or if necessary under pressure in an autoclave.

The following examples illustrate the invention:

Example 1

An artificial yarn made of a cellulose acetate-phthalate containing about two acetyl groups and about ¼ to ½ of a phthalate group per $C_6H_{10}O_5$ molecule is heated at 40 to 50° C. in glycol containing 2% of sulphuric acid for about 3 to 5 hours or until it has become insoluble in acetone.

Example 2

An artificial yarn having a basis of about equal parts of a cellulose ester containing about two acetyl groups and a ¼ of a chloracetyl group and a cellulose ester containing about two acetyl groups and a ¼ of an amino-acetyl group per $C_6H_{10}O_5$ molecule, both of which may be prepared for example, by the process described in British Specification No. 320,842, is heated for several hours at about 100° C. in the vapour of ω-chlorheptylamine.

After completion of the reactions described in the above examples the yarns are well washed to free them from the reagents used in the reactions and from any by-products formed, and are then dried at a low temperature, for example about 50° C.

As indicated above, one of the advantages which may be obtained by the process of the present invention is a reduction in the solubility of the products in organic solvents. A further advantage is that the tendency of yarns and similar articles to creasing may be reduced. Moreover, when basic or acid amide groups are introduced into the materials, as for example, in the case when a diamine is reacted with cellulose derivative materials, the dyeing properties of the materials may be improved and in particular they may acquire an affinity for acid dyestuffs.

Having described my invention, what I desire to secure by Letters Patent is:

1. Process for the treatment of cellulose derivatives, which comprises reacting a lower fatty acid ester of cellulose containing, indirectly attached to the cellulose nucleus, a carboxy group with an organic compound of from 2 to 8 carbon atoms containing at least two radicles which react with the said carboxy group, at a temperature of about 40 to 150° C.

2. Process for the treatment of cellulose derivatives, which comprises esterifying with an organic dihydroxy compound of from 2 to 8 carbon atoms a lower fatty acid ester of cellulose containing a carboxy group indirectly attached to the cellulose nucleus, at a temperature of about 40 to 150° C.

3. Process for the treatment of cellulose derivatives, which comprises reacting with a dinitrile a lower fatty acid ester of cellulose containing a carboxy group indirectly attached to the cellulose nucleus, at a temperature of about 40 to 150° C.

4. Process for the treatment of cellulose derivatives, which comprises reacting with butadiene dioxide a lower fatty acid ester of cellulose containing a carboxy group indirectly attached to the cellulose nucleus, at a temperature of about 40 to 150° C.

5. Process for the treatment of cellulose derivatives, which comprises reacting a mixture of a lower fatty acid ester of cellulose containing, indirectly attached to the cellulose nucleus, a carboxy group, and another lower fatty acid ester of cellulose containing another type of reactive radicle indirectly attached to the cellulose nucleus with an organic compound of from 2 to 8 carbon atoms containing a radicle which reacts with the carboxy group and another radicle which reacts with the radicle in the other lower fatty acid ester of cellulose, at a temperature of about 40 to 150° C.

6. Process for the treatment of cellulose derivatives, which comprises reacting a mixture of a lower fatty acid ester of cellulose containing a halogen atom indirectly attached to the cellulose nucleus and another lower fatty acid ester of cellulose containing an amino group indirectly attached to the cellulose nucleus with an organic compound of from 2 to 8 carbon atoms containing both a halogen atom and an amino group, at a temperature of about 40 to 150° C.

HENRY DREYFUS.